United States Patent
Nielsen

(10) Patent No.: US 7,687,093 B2
(45) Date of Patent: Mar. 30, 2010

(54) METHOD AND AN APPARATUS FOR THAWING FROZEN MEAT

(75) Inventor: Bjarne Nielsen, Vadum (DK)

(73) Assignee: SFK Systems A/S, Aalborg SO (DK)

( * ) Notice: Subject to any disclaimer, the term of this patent is extended or adjusted under 35 U.S.C. 154(b) by 1135 days.

(21) Appl. No.: 10/542,758

(22) PCT Filed: Jan. 29, 2004

(86) PCT No.: PCT/DK2004/000060

§ 371 (c)(1), (2), (4) Date: Dec. 19, 2005

(87) PCT Pub. No.: WO2004/066742

PCT Pub. Date: Aug. 12, 2004

(65) Prior Publication Data

US 2006/0147595 A1    Jul. 6, 2006

(30) Foreign Application Priority Data

Jan. 29, 2003   (DK) ............................... 2003 00118

(51) Int. Cl.
*A23B 4/07*  (2006.01)
(52) U.S. Cl. .................... 426/524; 426/645; 426/513; 426/518
(58) Field of Classification Search .................. 426/76, 426/104, 512–513, 518, 524, 641–647, 479–480; 99/349, 352, 353, 537; 100/39, 42, 226, 100/232, 295, 910; 241/23, 24.16
See application file for complete search history.

(56) References Cited

U.S. PATENT DOCUMENTS 1,950,763 A * 3/1934 Walter ........................ 426/393
2,241,807 A * 5/1941 Cotner ........................ 91/524
2,670,296 A * 2/1954 Tansley ...................... 426/513
3,677,167 A * 7/1972 Berg ....................... 53/111 RC
3,818,977 A   6/1974 Lohr
4,060,998 A * 12/1977 Bernard ....................... 62/320
4,504,498 A   3/1985 Kissam (Continued)

FOREIGN PATENT DOCUMENTS

AU           9530402 B  *  3/1996

(Continued)

*Primary Examiner*—Drew E Becker
(74) *Attorney, Agent, or Firm*—William J. Sapone; Coleman Sudol Sapone P.C.

(57) ABSTRACT

The invention comprises a method of thawing meat frozen in meat blocks (1) and comprising an apparatus for initial separation of the meat block (1) before the meat block (1) is placed in a rotating container (7), said meat block (1) being subjected to pressure before treated in the rotating container (7), said pressure initiating a separation process of the meat block (1) into individual pieces (2). This pressure may be applied over the diagonals of the meat block (1). The invention also comprises an apparatus for performing the method, said apparatus comprising a number of pistons (3, 4, 5, 6) which either cooperate in pairs or cooperate with a firm opposite face for applying pressure to the meat block (1). The faces of the pistons (3, 4, 5, 6) may be plane, or they may comprise elevations or depressions as well as adapted to act over at least one of the diagonals of the meat block (1).

10 Claims, 3 Drawing Sheets

U.S. PATENT DOCUMENTS

| | | | |
|---|---|---|---|
| 4,512,523 A * | 4/1985 | Higashimoto | 241/82.4 |
| 4,714,618 A * | 12/1987 | Matsuda | 426/524 |
| 4,742,686 A * | 5/1988 | Cook | 62/64 |
| 4,892,260 A * | 1/1990 | Hager et al. | 241/282.2 |
| 4,906,486 A * | 3/1990 | Young | 426/518 |
| 4,992,289 A * | 2/1991 | Kiczek | 426/479 |
| 5,080,922 A * | 1/1992 | Hosokawa | 426/646 |
| 5,250,314 A * | 10/1993 | Jones | 426/512 |
| 5,333,802 A * | 8/1994 | Seelig et al. | 241/65 |
| 5,401,520 A * | 3/1995 | Skaar et al. | 426/524 |
| 5,667,153 A * | 9/1997 | Haack et al. | 241/82.5 |
| 6,183,795 B1 * | 2/2001 | Yates | 426/385 |
| 6,224,932 B1 * | 5/2001 | Stahmann et al. | 426/479 |
| 7,306,820 B2 * | 12/2007 | Hoashi et al. | 426/643 |
| 7,357,952 B2 * | 4/2008 | Foroutanaliabad et al. | 426/241 |
| 2006/0034991 A1 * | 2/2006 | Nielsen | 426/524 |

FOREIGN PATENT DOCUMENTS

| | | |
|---|---|---|
| DE | 3142703 A1 | 5/1983 |
| GB | 2321001 A | 7/1998 |

* cited by examiner

METHOD AND AN APPARATUS FOR THAWING FROZEN MEAT

The problem to be solved by the invention is to thaw frozen meat from a temperature which will frequently be in the range from −15 to −24° C. The meat is frozen in blocks and will in most cases be smaller pieces of meat which have frozen into a larger block. It is therefore difficult to thaw all the pieces at the same rate.

EP Patent Application No. 0 574 327 A 1 discloses an apparatus for the thawing of meat in a horizontally rotating container. One or more frozen blocks of meat are placed in a hermetically sealed container, which is rotated about a horizontal shaft. To accelerate the thawing process, the container and/or a mixer means in the form of carriers may be provided with a cavity in which hot liquid may circulate. During thawing, salt or brine may be added to the container to accelerate the thawing and start salting of the meat. Vacuum may moreover be applied to the container, which also con-tributes to reducing the thawing time of the meat blocks.

Although, in this known apparatus, steps have been taken to reduce the thawing time for frozen meat blocks, it is important that the thawing takes place at the same rate as far as possible for all the individual pieces which constitute a meat block.

This problem may be solved by using the method according to the invention, which, through the use of an initial separation process prior to the placing of the meat block in the rotating container, causes the meat block to be separated more rapidly into individual pieces, thereby reducing the total thawing time considerably.

This separation process takes place in that pressure is applied to a meat block prior to the placing thereof in a rotating container. This pressure may be supplied from two cooperating pistons or a piston which presses the meat block against a form of dolly or stop. This pressure is applied over opposed sides of the meat block and may be applied over one, two or three pairs of opposed sides, respectively.

This pressure initiates a thawing process between the individual pieces of meat of which a meat block is composed. For one thing, the thawing process is initiated by the applied pressure, for another, mutual separation of the individual pieces of meat is initiated, but care should be taken not to subject the individual pieces of meat to too great mutual displacements since this involves the risk that the meat fibres are torn off from the pieces of meat.

In a special embodiment, the piston may be configured such that the pressure may be applied over one of the diagonals of the meat block.

When a meat block is to be thawed, it frequently comes from an area where the temperature ranges between about −15 and −24° C. The block or blocks of meat may then be placed in a form of equalization room where the temperature is preferably kept such that the temperature of the block or blocks is around −10° C., thereby achieving a form of warming of the meat. The meat is then taken out of the package. Here, the cardboard package constituting the outer package for the meat block is removed first. The meat block is additionally packaged in plastics. This plastics package may either be removed before applying pressure to the meat block, or after the meat block has been subjected to pressure. The plastics may optionally be cut before applying pressure, following which the plastics is removed after the meat block has been subjected to pressure. Removal of cardboard and/or plastics may take place manually or by machine.

At a point in the process, the meat block is passed through a metal detector to ensure that no pieces of metal or the like are included in the thawing process, as pieces of metal might be able to penetrate into pieces of meat. The metal detector may be arranged randomly in the process, but prefer-ably at a time in the process as early as possible.

When the meat block is subsequently placed in the rotating container by generally known transport means, the block will be separated more rapidly into smaller individual pieces, and thereby the individual pieces will be thawed more rapidly. This ensures that the individual pieces are separated more rapidly from the block, and are thereby affected by the thawing means present in the container at an earlier time in the process, thus releasing the greatest possible surface on the individual pieces of meat.

When the block or blocks of meat are placed in the rotating container, and the block or blocks are about to be separated into the smaller pieces of meat, of which a block consists, after preceding treatment by pressure, the rotating container may change the inclination of its axis of rotation relative to the horizontal in a predetermined manner. This results in a movement of the individual pieces of meat in a longitudinal direction in the container, which also contributes to reducing the thawing time, as a more uniform distribution of the heat impact is achieved.

To reduce the thawing time additionally, steam may be introduced into the container during its rotation. The steam is supplied to the container in a controlled amount and preferably at a reduced steam pressure, e.g. in a range from 0.2 bar to 0.9 bar and with controlled intervals. It is also important that the steam is not fed directly to the meat, as the surface temperature of the meat may not become too high, and no form of colour change may occur.

Brine may moreover be added during the process, as needed. Flavouring agents may be added to the brine, as needed. In the last steps of the process, the container may be subjected to cooling, likewise to prevent the surface temperature of the meat from getting too high.

Since one of the important factors in the thawing of meat is to minimize the proliferation/development of bacteria, it is important that the temperature does not become too high, and that the time is kept as short as possible, since development of bacteria, if any, will take place exponentially.

The thawing process itself may be performed in a variety of process steps and may be controlled on a variety of parameters to achieve a more uniform heat distribution during thawing. These parameters may be regulation/control of the speed of rotation and/or direction of rotation of the container, regulation/control of the negative pressure/vacuum of the container, regulation/control of the supply of energy to the container, including particularly the injection of steam, regulation/control of the degree of inclination of the container, and regulation/control of the metering of brine to the container.

The method of the invention provides a plurality of advantages, which may be expressed inter alia by a considerable reduction of the thawing time (process), increased certainty of detecting metal possibly present in the meat, possibility of optimum visual monitoring with respect to plastics possibly present in the meat, reduction of protein loss and of bacterial contamination by virtue of the improved temporal course, and because the process proceeds in a closed process, and finally this process involves less manual handling.

Reference is made below to the drawing, in which

Figure 1:
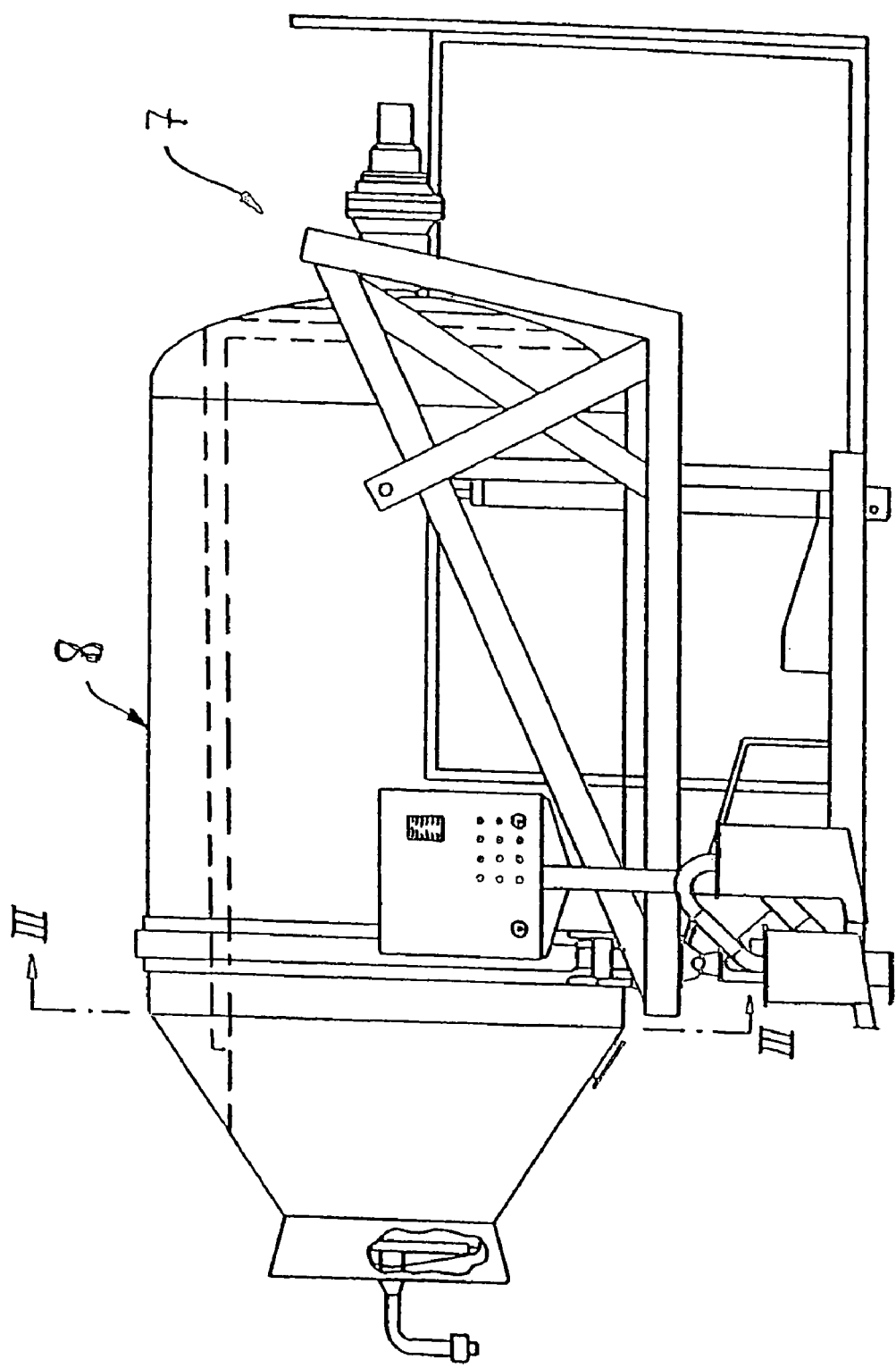
FIG. 1 shows a rotating container for use in the method.
Figure 2:
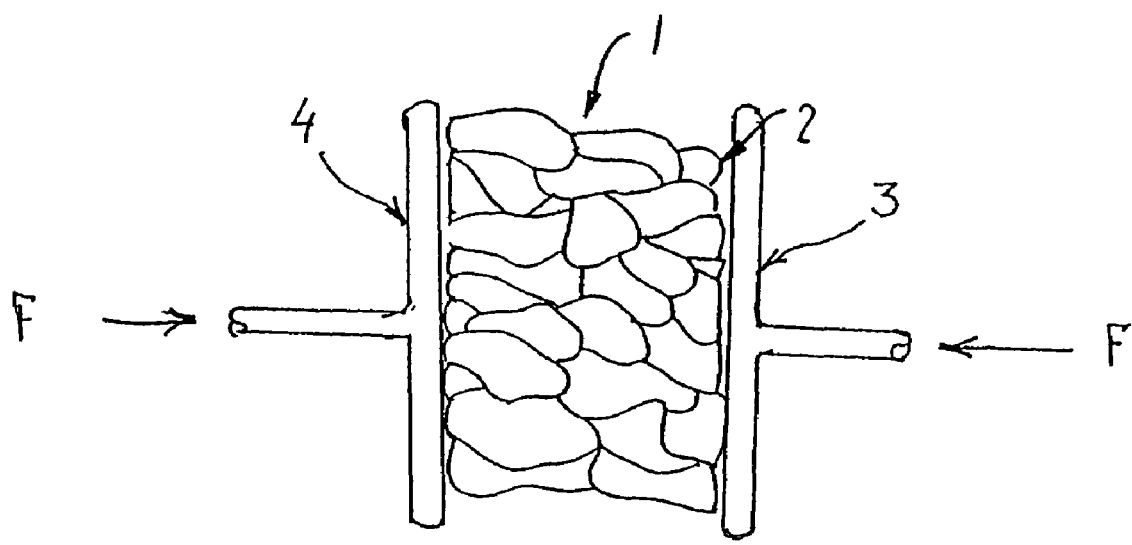
FIG. 2 shows a pressing device for use in the method.
Figure 3:
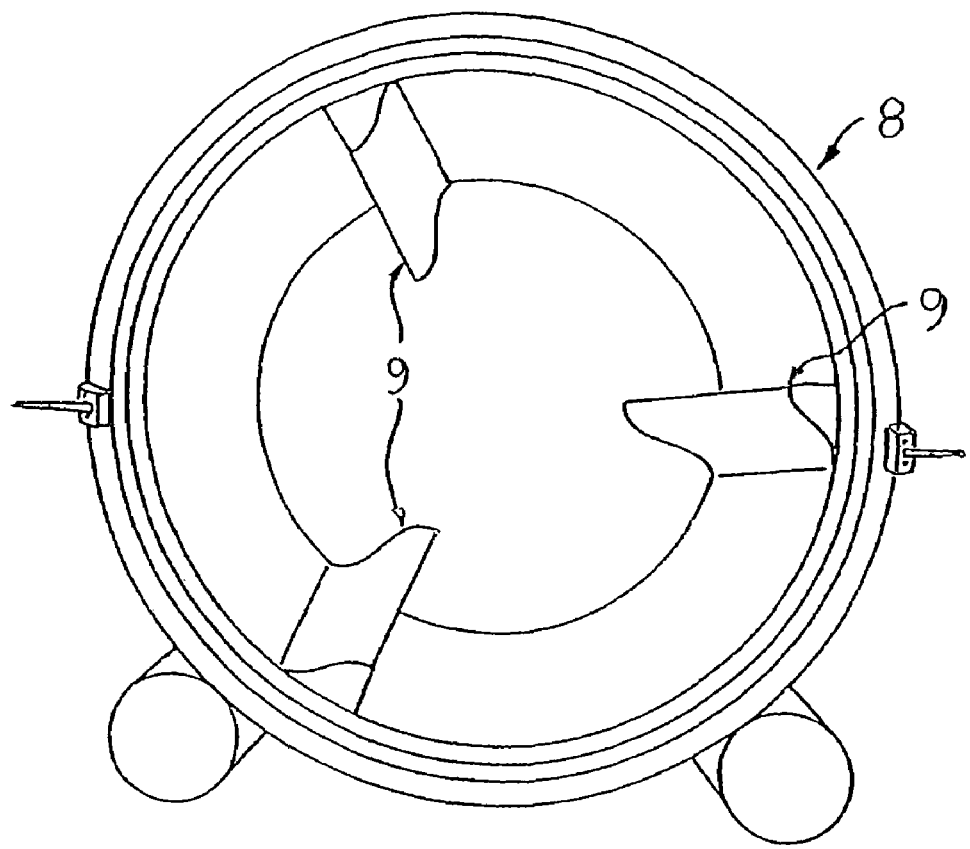
FIG. 3 shows the rotating container seen in section.
Figure 4:
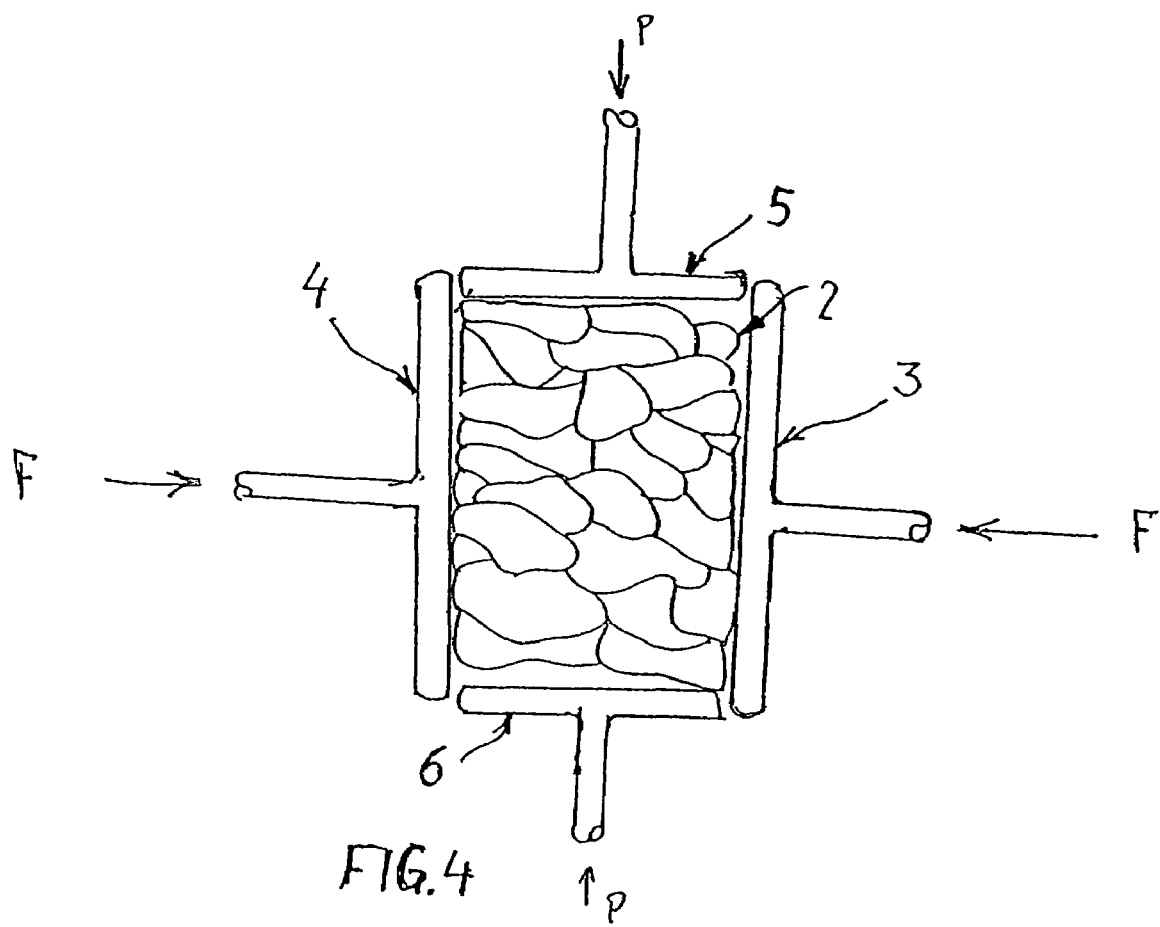
FIG. 4 shows a further embodiment of a pressing device.

Preferred embodiments of the method according to the invention as well as preferred embodiments of an apparatus for performing the method according to the invention will now be described.

When a plurality of meat blocks 1 consisting of several smaller pieces of meat 2 are to be thawed, the meat block is placed at a location where a force F is applied to the meat block 1 by means of one or more pistons 3, 4, 5, 6, which cooperate with one or more stops, or one or more cooperating pairs of pistons 3, 4, 5, 6. A thawing process is hereby initiated by the applied pressure, which may be calculated from the necessary force per piston area. It is important that the travel of a piston or the total travel of a pair of pistons is not too great, as this may cause the individual pieces of meat 2 to be subjected to mutual displacements which are so great that meat fibres are torn off the pieces of meat 2.

The meat blocks 1 are usually packaged in plastics as well as in an outer package normally formed by cardboard. The most important thing, how-ever, is that the outer package is removed before the meat block is treated according to the invention. The inner package in the form of plastics, to which vacuum or a form of bacteria impeding gas has optionally be applied, may optionally be cut before the meat block 1 is subjected to pressure. When the meat block 1 has been subjected to pressure, the inner package is removed completely. Removal of cardboard and/or plastics may take place manually as well as by machine.

At a time as early as possible in the thawing process, preferably immediately after the removal of the package, the meat block is moved through or past a metal detector, so that any present pieces of metal are detected be-fore the individual pieces of meat 2 are softened, whereby a piece of metal might more easily penetrate into the meat.

The meat block 1 is then placed in a rotating container 7 by generally known transport means. The container 7 is preferably formed with a jacket 8 as the central part. A plurality of carriers 9 are arranged internally in the jacket, said carriers 9 constituting a form of massage blades for affecting the pieces of meat 2 so as to separate them from the meat block 1 and so as to cause the individual pieces of meat 2 to thaw.

Since, already at this time, the meat block has been subjected to the initial separation process, the meat block 1 will more rapidly be separated into the smaller individual pieces 2, and the individual pieces 2 will thereby be thawed more rapidly in the container, as the individual pieces 2 are affected by the thawing means 9 present in the container 8 at an earlier time in the process than before, thereby making the greatest possible surface available on the individual pieces of meat.

The container 7 may be regulated on the basis of a plurality of parameters to give the optimum thawing for a specific type of meat which is to be thawed.

The apparatus itself, which is used for applying the necessary pressure F to the meat block 1, comprises a number of pistons 3, 4, 5, 6 which may vary in number from one to a plurality corresponding to the sides or corners of meat block 1. In an embodiment with just one piston 3,4,5,6, the piston 3, 4, 5, 6 presses the meat block 1 against a stop or a firm face so as to create a form of compression of the meat block. In another embodiment, the pressing device may be provided by means of a pair of opposed pistons 3, 4,5,6 which are moved toward each other. Further embodiments comprise configurations with two or even three pairs of pistons 3, 4, 5. 6 cooperating in pairs. These pistons preferably have a plane surface, but may also be provided with an irregular surface so that increased displacement of the individual pieces of meat is achieved.

In another embodiment, one or more pistons 3, 4, 5, 6 apply a pressure to the meat block over diagonal corners, said pistons being arranged to grip a corner.

In a combination of the above-mentioned configurations of the pistons, a further embodiment may be advantageous, viz. using mainly the essentially plane pistons which are provided with some outwardly inclined elevations at their corners, so that when the pistons are pressed against the meat block 1, some resultant forces will occur which are directed toward the centre of the meat block, which results in a displacement of the individual pieces of meat in more than one direction.

The invention claimed is:

1. A method of thawing pieces of meat frozen in meat blocks, comprising providing an apparatus for initial separation of the pieces frozen in the meat block before the meat block is placed in a rotating container, using the apparatus for applying pressure to the meat block (1) before the meat block is treated in the rotating container (7), for initiating a thawing of the meat block and a separation of the meat block (1) into individual pieces (2); placing the treated meat block and any separated individual pieces into the rotating container; and, rotating the container for completing the separation of the meat block into individual pieces and for completing the thawing of the separated pieces of meat.

2. The method according to claim 1, wherein the pressure is applied over diagonals of the meat block (1).

3. The method according to claim 1 further comprising, after applying pressure to the meat block, removing a package from the meat block before the meat block (1) is placed in the rotating container (7).

4. The method according to claim 1 wherein the apparatus comprises a number of pistons (3, 4, 5, 6) which either cooperate in pairs or cooperate with a firm opposite face for applying the pressure to the meat block (1) placed therebetween.

5. The method according to claim 4 further comprising providing the pistons (3, 4, 5, 6) with planar faces which face towards the meat block (1).

6. The method according to claim 4 further comprising providing the pistons (3, 4, 5, 6) with faces having elevations or depressions facing toward the meat block (1).

7. The method according to claim 4 further comprising providing the pistons (3, 4, 5, 6) with an outwardly inclined elevation in at least one corner facing toward the meat block (1).

8. The method according to claim 4 further comprising providing the pistons (3, 4, 5, 6) with depressions facing towards the meat block (1) for receiving corners of the meat block (1) therein.

9. The method according to claim 4 further comprising positioning the pistons (3, 4, 5, 6) for applying the pressure to the meat block (1) over a diagonal or diagonals of the meat block (1).

10. The method according to claim 4 further comprising providing means for detecting metal, and, using the detecting means on the meat block or the individual pieces to detect whether any metal is contained therein.

* * * * *